May 8, 1951 — J. E. JENDRISAK — 2,551,607
BENDING MOLD

Filed Dec. 31, 1948 — 2 Sheets-Sheet 1

Inventor
Joseph E. Jendrisak
By Nobbe & Swope
Attorneys

May 8, 1951

J. E. JENDRISAK 2,551,607

BENDING MOLD

Filed Dec. 31, 1948

Inventor
Joseph E. Jendrisak
By Nobbe & Swope
Attorneys

Patented May 8, 1951

2,551,607

UNITED STATES PATENT OFFICE 2,551,607

BENDING MOLD

Joseph E. Jendrisak, Rossford, Ohio, assignor to Libbey-Owens-Ford Glass Company, Toledo, Ohio, a corporation of Ohio Application December 31, 1948, Serial No. 68,533

8 Claims. (Cl. 49—67)

This invention relates to glass bending apparatus and in particular to an improved mold and frame for supporting the mold.

In the bending of glass sheets that are to be used as windows it is necessary that the optical quality of the glass be preserved. Furthermore, if the bent glass is to accurately fit the window frame so that it may be installed without setting up dangerous stresses in the glass it is necessary that the marginal area of the glass conform precisely with its intended shape. It is also desirable that sagging of the glass during the bending operation other than the sagging to conform to the shaping surface of the mold shall be kept to a minimum. A still further requirement is that the glass shall come into contact with the shaping surface of the mold without sliding over any portion of the mold.

The foregoing requirements which must be met if commercially satisfactory bent glass is to be produced are particularly difficult to satisfy if the glass has regions of relatively sharp curvature separated by other regions of small curvature. The usual difficulty encountered is that if the glass is heated until the regions of sharp curvature may be easily formed the relatively flat areas of the glass are so soft that they sag out of shape. This trouble can be largely avoided by localized heating and/or shielding and, according to this invention, by dividing the mold into a plurality of sections that are movable relative to each other and that are supported so that forces other than the weight of the glass are applied to the glass in directions tending to force it into the desired shape. By the use of such additional force and by designing the mold so that the force is applied to those portions of the glass requiring the greatest curvature the glass may be bent to the desired shape without heating any of it to temperatures such that it tends to sag out of shape.

The principal object of this invention is to provide a novel type of multiple hinged mold which will support the glass in the flat, and subsequently carry it into its final bent shape, while at the same time folding up in a manner to present a properly contoured bending surface to the glass as it reaches the end of its bending movement.

Another object is the provision of an improved mold and support therefor which exerts a large amount of force tending to drive a properly heated sheet of glass to be bent into its bent form without marring the glass or setting up any undesired permanent stress in the glass.

Another object of the invention is to provide an improved rack or frame that is formed of a plurality of parts which may be assembled in different relative positions to accommodate molds of various sizes.

A still further object of the invention is to provide a mold support from which a mold is suspended and in which horizontal forces developed by out-of-plumb conditions of the supporting links introduce forces tending to bend the glass to its final shape.

A still further object of the invention is to assemble a plurality of mold sections by means of hinge connections and to support the assembled hingedly connected sections from the ends thereof so that they tend to assume a shape at which a shaping surface formed on the sections corresponds to the marginal area of a bent sheet of glass.

A still further object of the invention is to provide a mold that comprises a plurality of members hingedly connected together and arranged so that the pivotal movement between certain of said members is limited thereby controlling the range of movement of some of the members with respect to the others.

More specific objects and advantages are apparent from the following description of a preferred embodiment of a glass bending mold embodying the invention.

According to the invention a plurality of sections hingedly connected together to form a mold are suspended from links which in turn are supported from a framework which, in assembly, is adjustable to accommodate molds of various sizes. The position of the suspending links with respect to the hinged mold is such that when the mold is extended by opening the hinges to accommodate a flat glass sheet in bending relation to the mold the links are out of plumb. The links consequently exert a substantial compression force against the glass so that the glass is stressed as a column and is forced quickly to final shape as the column of glass softens and sags. The mold sections are provided on their upper edges with a shaping surface adapted to contact the marginal areas only of a glass sheet being bent. The hinges connecting the various portions of the mold are located far enough below the shaping surface so that by a small angular movement in each of the hinge connections the end sections of the mold may be separated far enough to accommodate the length of the flat sheet of glass. The end sections of the glass are held substantially in contact with the end portions of the shaping surface. As the glass softens and settles toward the shaping surface the hinged joints close and reach fully closed condition when the glass has settled into contact with the shaping surface.

As an added feature the outline of the frame and the mold in front elevation are substantially the same so that the mold and its glass burden may be passed through a tempering station in which blasts of cool air are driven against the upper and lower surfaces of the hot bent glass.

An improved mold constructed according to the invention is illustrated in the accompanying drawings.

These specific figures and the accompanying description are intended merely to illustrate the invention but not to limit its scope.

Figure 1:
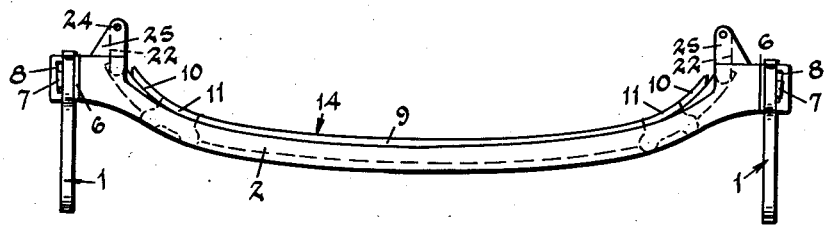
Figure 1 is a front elevation of the improved mold and frame.

As illustrated in the figures the supporting framework for the improved mold comprises a pair of end sections 1 and a pair of side rails 2. In front elevation (Figure 1) the side rails 2 are curved to conform generally to the curvature of a bent glass sheet. The end sections 1 and the side rails 2 together form, in plan, a generally rectangular frame within the outlines of which the mold itself is suspended.

Figure 3:
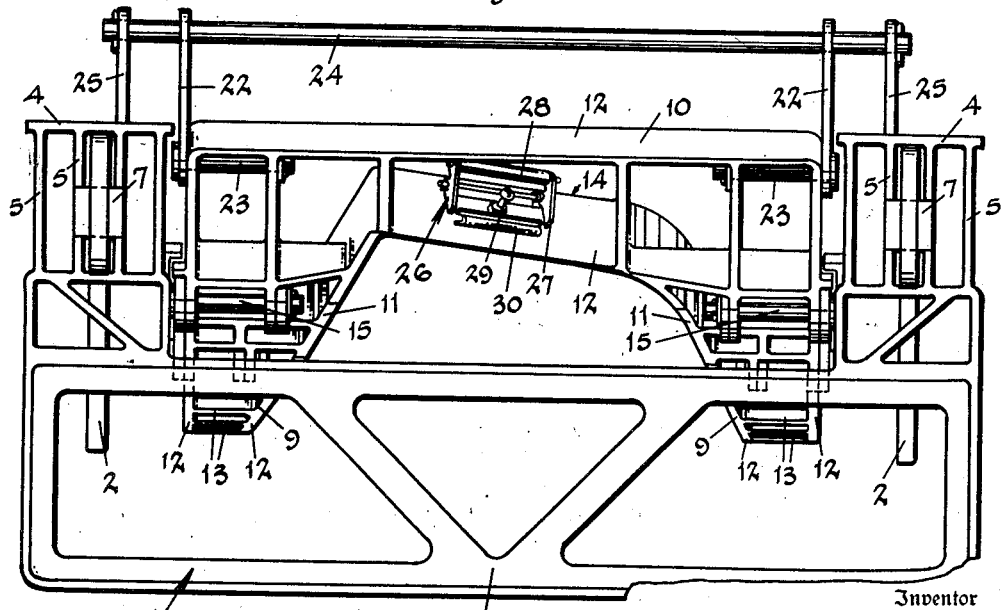
Figure 3 is an end elevation of the improved mold and frame.
Figure 4:
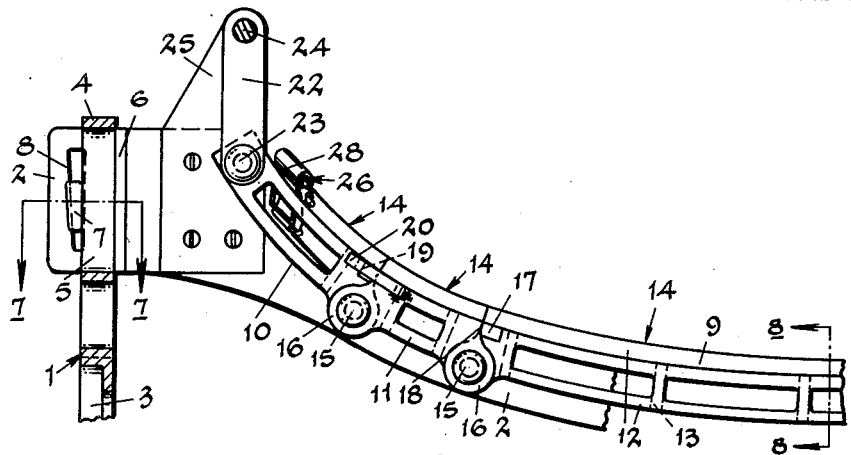
Figure 4 is a fragmentary front elevation, partly in section, of one end of the mold and its support taken substantially along the line 4—4 of Figure 2.
Figure 7:
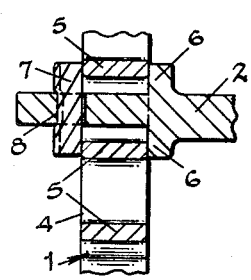
Figure 7 is a fragmentary detail taken substantially along the line 7—7 of Figure 4, showing the assembly of the side member of the frame to the end member.

Referring to Figure 3, each end section 1 is formed of a single casting which is generally U-shaped in outline having a base portion 3 and upstanding leg portions 4. The upper ends of the upstanding leg portions 4 are each composed of four vertical bars 5 that are joined top and bottom to form three vertically elongated windows through which the ends of the side rails 2 may be inserted. Referring to Figures 4 and 7, each of the side rails 2 is provided with machined shoulders 6 that abut one side of the vertical bars 5 so that when wedges 7 are driven into place in vertical V-shaped slots 8 in the ends of the side rails 2 the rails are locked securely into position with respect to the end sections 1.

The spacing between the side rails 2 may be selected according to the width of the mold to be used by proper selection of the windows through which the ends of the side rails 2 are inserted and locked. Since there are three such windows or openings in each of the upstanding legs 4 of the end sections 1 it follows that five widths are available ranging from the widest adjustment, when the side rails 2 are inserted in the outermost windows, to the narrowest adjustment when the side rails 2 are inserted in the innermost or laterally adjacent windows. While the ends of the side rails 2 are shown as being a loose fit in the windows they may, in practice, be provided with laterally projecting bosses that closely engage the bars 5 and thus hold the rails in central position in the windows.

Since the molds and frames, in the bending of glass, are alternately subjected to heating and cooling conditions, and since any heat that is carried in the frame from the heating zone to the cooling zone is so much energy loss and since the introduction of any cold body having large heat capacity into the heating furnace upsets the temperature distribution, the frame is made as light as possible consistent with the required strength. In carrying out this thought the end sections 1 are merely skeletons with only sufficient cross webs and bracing struts to prevent failure in use. Likewise the side rails 2 are made of relatively small cross sectional area but of large enough moment of inertia so that they are stiff enough to hold the end sections 1 in proper alignment.

Figure 2:
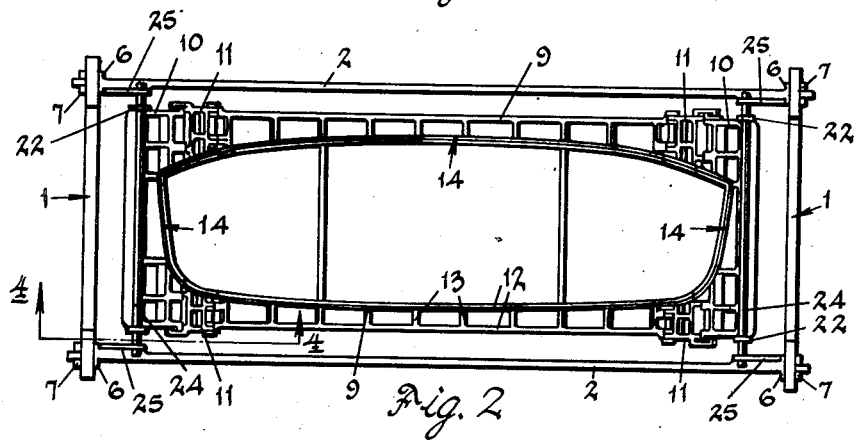
Figure 2 is a plan view of a mold and frame.

Referring to Figure 2 the improved mold comprises a plurality of hingedly connected sections, the range of movement of the sections and the shape of each being determined by the desired shape of the bent glass sheet. In the illustrated mold the bent glass sheet is relatively flat except for relatively short lengths at each end having considerably greater curvature as may be seen in Figure 1. As the curvature of the bent glass increases the length of the shaping surface of the mold that can be carried on any one mold portion decreases.

As shown the improved mold includes a relatively long and fairly flat central section 9, a pair of end sections 10 and two sets of short intermediate sections 11 that are hingedly connected to the central section 9 and the end sections 10.

Each of the mold sections is a cast framework having spaced apart rails 12 that are interconnected by cross webs 13 to form an open work structure possessing great strength in comparison to its mass.

Figure 8:
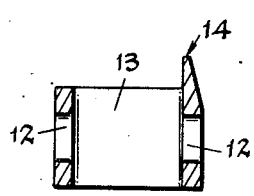
Figure 8 is a fragmentary section taken along the line 8—8 of Figure 4 and showing the relation between the shaping surface of the mold and the remainder of a side member of the mold.

Referring to Figure 8, which is the section taken along the line 8—8 of Figure 4 at a point located near the center of the central section 9 of the mold, it will be noticed that the inner one of the rails 12 projects vertically above the other and is beveled to provide a narrow, continuous, upwardly directed rim 14 serving as the shaping surface of the mold. Each of the mold sections is provided with a portion of the shaping surface which in one position of the mold conforms to the marginal area of the bent glass sheet.

Figure 5:
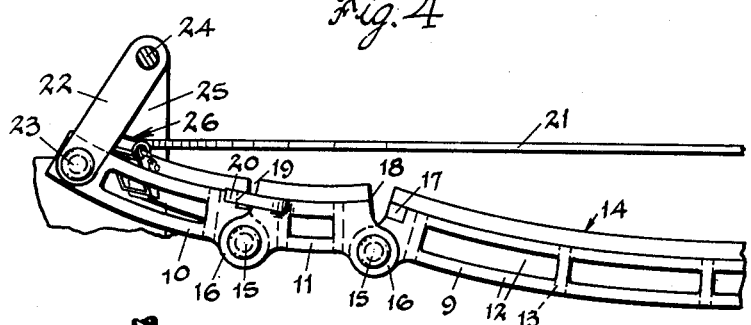
Figure 5 is a view generally similar to Figure 4 but showing the mold in its open position to accommodate a flat sheet of glass.
Figure 6:
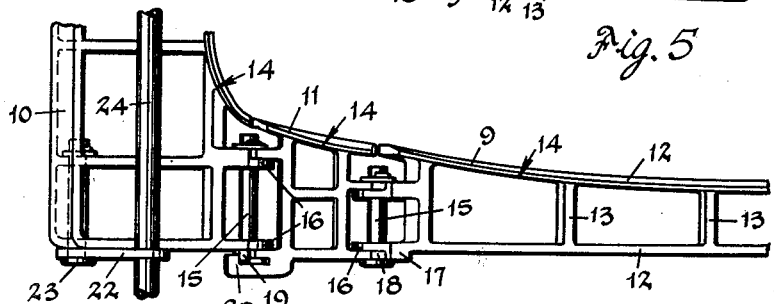
Figure 6 is a fragmentary plan view of one corner of the improved mold.

Referring to Figures 4, 5 and 6 the mold sections 9, 10 and 11 are connected by hinge pins 15 passing through holes in overlapping ears 16 of the mold sections. The hinge pins 15 and ears 16 are located near the bottom of the rails 12 of the mold sections so that a relatively small angular movement between the sections results in relatively large gaps in the shaping surface.

The mold sections 9, on the outer rails 12 and just below the level of the shaping surface 14, are provided with lugs 17 which by striking the adjacent ends 18 of the rails 12 of the intermediate mold sections 11 limit the relative angular movement between these mold sections. The movement is limited so that the shaping surfaces 14 of the mold sections 9 and 11 may form a substantially continuous line as shown in Figure 4.

The end mold sections 10 are similarly connected to the intermediate sections 11 and are provided with lugs 19 which at the closed limiting position abut the adjacent ends of the side rails 12 of the intermediate mold sections 11. In this position the shaping surface 14 of the end sections 10 forms a continuation of the shaping surface on the other mold sections. The opening movement between the end mold sections 10 and intermediate sections 11 is also limited by the cooperation of hooks 20 formed integrally with the intermediate mold sections 11 and the lugs 19 to substantially that shown in Figure 5. The hooks 20 are included for the convenience of the operator in loading glass sheets 21 onto the mold since without such hooks the mold tends to collapse with the joint between the end sections 10 and intermediate sections 11 wide open and the joint between the intermediate section 11 and center section 9 closed. This condition is undesirable because portions of the shaping surface 14 of the intermediate mold sections 11 are raised above the level of the shaping surface 14 of the end sections 10 thereby rendering it practically impossible to position the glass sheets in bending relation to the mold. The hooks 20 by limiting the opening between the end sections 10 and the intermediate sections 11 insures that no portion of the shaping surface 14 approaches closely to an unbent glass sheet supported in bending relation to the open mold.

The hinged mold comprising the sections 9, 10 and 11 is supported from the frame by means of links 22 that pivotally engage pins 23 set in the framework of the end sections 10 of the mold. The links 22 are attached to and depend from cross rods 24 that are rotatably carried in upright plates 25 erected from the side rails 2 of the frame. The plates 25 are oriented with respect to the mold so that the links 22 hang vertical or nearly so when the mold is in its closed position as shown in Figure 4. The links swing back away from each other a substantial distance when the mold is raised to its open or nearly straight condition as shown in Figure 5. When in the open position the horizontal component of the force transmitted through the links 22 tends to return the mold to its closed position.

Figure 9:
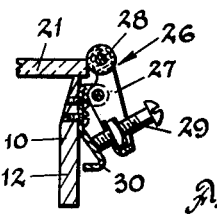
Figure 9 is a fragmentary sectional detail showing one of the glass locating devices and its mounting from the end section of the mold.

The general arrangement of the links 22, plates 25 and supporting rod 24 with respect to the end section 10 of the mold and the frame end section 1 is shown in Figure 3. This figure also shows a locating assembly 26 that is attached to the outer edge of one of the flanges 12 of the end section 10 just outside and extending above the level of the shaping surface 14. The locating assembly 26 includes a small pivoted frame 27 (see also Figure 9) which at its upper end carries a ceramic roller 28 and at its lower end is provided with an adjusting screw 29 that rides on a spring 30.

When this mold is in use the glass sheets 21 are inserted between the locating assemblies 26 with the ceramic rollers 28 bearing against the ends of the glass. The rollers 28 and the adjacent portions of the shaping surface 14 are separated far enough to admit the glass by the opening of the various hinged joints which introduce gaps into the shaping surface. As mentioned previously the location of the hinge pins 15 with respect to the shaping surface 14 results in large gaps for small relative angular movement of the mold sections.

In the open position, because of the tension exerted by the chain of mold sections as well as the compression forces exerted by the inclination of the links 22, the glass is stressed as a column. As the mold progresses through the bending furnace the glass softens and, being unsupported throughout its length, tends to sag immediately. As soon as it sags out of a straight line, it no longer has sufficient strength as a column to resist the compression forces and it therefore quickly bends until its center section comes into contact with the center of the shaping surface 14 of the center section 9 of the mold. From this point on the generally horizontal force exerted against each end of the glass, especially when assisted by controlled or localized heating, tends to bend it still further toward the desired curvature. The further the glass bends out of a straight line the more effective is the force in producing the desired curve.

Referring to Figure 5 it will be noticed that the gap between the shaping surface of the center mold section 9 and the intermediate sections 11 is much greater than the gap between the intermediate sections 11 and the end sections 10. As the glass softens and bends and because the weight of the center section 9 is carried by the intermediate sections 11, the gap between these sections closes before any relative movement between the intermediate and end sections occurs. Thus the shaping surface 14 of the intermediate mold sections 11 is dropped down out of the way of the glass 21 rapidly enough so that the glass does not drag on these surfaces and in fact does not touch these surfaces until near the end of the bending operation when the gaps between the intermediate and end sections close.

The arrangement of the hinge joints and the arrangement of the supporting rods 24 are selected according to the shape of the finished bent glass. If such shape is substantially cylindrical the axes of the hinges and the supporting rods are generally parallel. If the glass has curved sections that tend toward a modified conical form the hinge lines and the supporting rods 24 must be reoriented to remain generally parallel to elements of the desired conical surface. Furthermore, as was mentioned previously the lengths of the individual sections of the mold vary according to the sharpness of the curve being produced on and adjacent such sections. Thus in the mold shown in the drawings, the intermediate sections 11 and the end sections 10 have comparatively short lengths, as viewed in front elevation, compared with the length of the center section 9.

Various modifications of the hinged connections and supporting links in frame may be made without departing from the spirit and scope of the invention.

Having described the invention, I claim:

1. In a glass bending apparatus, in combination, a frame, a mold comprising a plurality of hingedly connected members arranged in end to end relationship, links for suspending the mold from the frame, and a shaping surface having a portion on each of said hingedly connected members.

2. In a glass bending apparatus, in combination, a mold comprising a plurality of hingedly connected members each having formed thereon a portion of a shaping surface, and an adjustable frame comprising end sections and side rails and from which the mold is suspended, the frame having a plurality of slots in each end section into which slots side rails may be selectively assembled.

3. In a glass bending apparatus, in combination, a frame having uprights erected therefrom, a mold comprising a plurality of members hingedly connected together, and links connected to the end ones of said members for suspending the mold from the uprights of the frame.

4. In a glass bending apparatus, in combination, a frame having an elevated portion, links depending from said elevated portion of the frame, a mold comprising a plurality of sections each carrying a portion of the shaping surface, hinged joints between the sections, the end sections being supported from said links, and means on the sections for limiting the relative movement of said sections to a first position at which the shaping surface is continuous and a second position at which the mold is extended to receive an unbent glass sheet.

5. In a glass bending apparatus, in combination, a frame having elevated portions, a mold comprising a plurality of sections each carrying a portion of the shaping surface of the mold, links depending from said elevated portions for supporting end sections of the mold from the frame, hinged joints connecting the mold sections together, means at each joint for limiting relative movement of the sections in one direction to a position at which the shaping surface is continuous and means adjacent at least all but two of the joints for limiting angular movement in the other direction.

6. In glass bending apparatus, a frame, a bending mold located within said frame and comprising a plurality of elongated members including end members and intermediate members having their ends pivotally connected together and movable into open and closed position relative to one another, link members for suspending said mold from said frame, means for pivotally connecting one end of said link members to said end members, means for pivotally connecting the opposite end of said link members to said frame at points that will cause the ends of said link members that are attached to said mold members to swing outwardly toward the ends of the frame when the mold is moved into open position.

7. In glass bending apparatus, a mold comprising a plurality of members hingedly connected in end to end relation and having a shaping surface formed on an upwardly directed face of each of said members conforming to the shape of a portion of a glass sheet bent on said mold, and means for suspending said mold, said means contacting only the sections constituting the two end sections of said mold.

8. In glass bending apparatus, a mold comprising a plurality of sections including end sections and central sections arranged in end to end relationship, at least portions of said end sections extending angularly with respect to said central sections and forming therewith a substantially continuous outline mold of a shape substantially conforming to the complete marginal outline of a glass sheet to be bent, means for hingedly connecting said sections together for movement to an open position for receiving an unbent glass sheet and into closed position for receiving a bent sheet, and a shaping surface conforming to the curvature to which it is desired to bend a glass sheet on said mold formed on upwardly directed surfaces of said sections.

JOSEPH E. JENDRISAK.

REFERENCES CITED

The following references are of record in the file of this patent:

UNITED STATES PATENTS

| Number | Name | Date |
| --- | --- | --- |
| 1,107,476 | Barot | Aug. 18, 1914 |
| 2,330,349 | Galey | Sept. 28, 1943 |